United States Patent
Rivlin

(10) Patent No.: US 11,238,168 B2
(45) Date of Patent: *Feb. 1, 2022

(54) SECURE, EFFICIENT, AND FLEXIBLE SEARCHABLE-ENCRYPTION TECHNIQUES

(71) Applicant: CyberArk Software Ltd., Petach-Tikva (IL)

(72) Inventor: Ofer Rivlin, Petach-Tikva (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/853,460

(22) Filed: Apr. 20, 2020

(65) Prior Publication Data

US 2021/0326456 A1 Oct. 21, 2021

(51) Int. Cl.
| | |
|---|---|
| *G06F 11/30* | (2006.01) |
| *G06F 12/14* | (2006.01) |
| *G06F 21/60* | (2013.01) |
| *G06F 40/247* | (2020.01) |
| *G06K 9/62* | (2006.01) |
| *G06F 16/36* | (2019.01) |
| *G06F 40/242* | (2020.01) |

(Continued)

(52) U.S. Cl.
CPC ........ *G06F 21/602* (2013.01); *G06F 16/3329* (2019.01); *G06F 16/36* (2019.01); *G06F 16/9535* (2019.01); *G06F 21/6209* (2013.01); *G06F 40/242* (2020.01); *G06F 40/247* (2020.01); *G06K 9/6215* (2013.01)

(58) Field of Classification Search
CPC .............. G06F 21/602; G06F 21/6209; G06F 16/3329; G06F 16/36; G06F 40/242; G06F 40/247; H04L 63/0281; H04L 2209/76

See application file for complete search history.

(56) References Cited

U.S. PATENT DOCUMENTS 6,789,195 B1 * 9/2004 Prihoda ................. G06F 21/602
                                                               713/155
9,118,631 B1 8/2015 Yung et al.
(Continued)

OTHER PUBLICATIONS

Communication and Search Report, issued from the European Patent Office in corresponding Application No. 20172541.3-1213 / 3683709, dated Jul. 10, 2020 (7 pages).
(Continued)

*Primary Examiner* — Phy Anh T Vu
(74) *Attorney, Agent, or Firm* — Finnegan, Henderson, Farabow, Garrett & Dunner, LLP

(57) ABSTRACT

Disclosed embodiments relate to performing secure and flexible searches of encrypted data. Operations may include maintaining a database of a plurality of sets of encrypted data; receiving a transformed search query for the database, the transformed search query having undergone a transformation process at a client including: identifying a plaintext string in a search query at the client, applying the plaintext string to a language dictionary accessible to the client, receiving, based on the language dictionary, one or more plaintext search strings, and encrypting, at the client, the one or more plaintext search strings; and returning a result based on the transformed search query, the result being based on the encrypted one or more plaintext search strings.

17 Claims, 10 Drawing Sheets

(51) Int. Cl.
  *G06F 16/9535*  (2019.01)
  *G06F 21/62*  (2013.01)
  *G06F 16/332*  (2019.01)

(56) References Cited

U.S. PATENT DOCUMENTS

| | | | |
|---|---|---|---|
| 9,256,762 | B1 | 2/2016 | Roth et al. |
| 10,528,556 | B1* | 1/2020 | Chmil .................. G06F 16/221 |
| 2006/0101285 | A1 | 5/2006 | Chen et al. |
| 2012/0102039 | A1* | 4/2012 | Gifford .............. G06F 16/2471 707/741 |
| 2014/0052999 | A1* | 2/2014 | Aissi ........................ H04L 9/08 713/189 |
| 2015/0154418 | A1* | 6/2015 | Redberg .............. G06F 21/6218 713/165 |
| 2015/0365385 | A1 | 12/2015 | Hore |
| 2016/0094521 | A1 | 3/2016 | Rao et al. |
| 2016/0292451 | A1 | 10/2016 | Diep et al. |
| 2016/0299924 | A1 | 10/2016 | Fujimoto et al. |
| 2016/0299978 | A1* | 10/2016 | Narayanan ........ G06F 16/24575 |
| 2016/0357869 | A1* | 12/2016 | Hang .................... G06F 16/248 |
| 2016/0366113 | A1* | 12/2016 | Dawoud ................ G06F 16/14 |
| 2017/0061151 | A1 | 3/2017 | Baessler et al. |
| 2017/0078251 | A1* | 3/2017 | Grubbs ............... H04L 63/0471 |
| 2017/0099263 | A1* | 4/2017 | Matsuzaki .......... H04L 63/0442 |
| 2017/0103227 | A1* | 4/2017 | Kerschbaum ....... H04L 63/0478 |
| 2018/0082076 | A1 | 3/2018 | Murray |
| 2018/0260469 | A1* | 9/2018 | Paris .................... G06F 16/285 |
| 2018/0278410 | A1* | 9/2018 | Hirano ................. G06F 16/951 |
| 2019/0102571 | A1 | 4/2019 | Wang et al. |
| 2019/0121873 | A1* | 4/2019 | Woodworth ........ G06F 16/3338 |

OTHER PUBLICATIONS

Cong Wang et al. "Achieving Usable and Privacy-Assured Similarity Search Over Outsourced Cloud Data," 2012 Proceedings IEEE INFOCOM, Mar. 1, 2020, pp. 451-459.

Scott Arciszewski, "How to Search on Securely Encrypted Database Fields", Retrieved From https://www.sitepoint.com/ how-to-search-on-securely-encrypted-database-fields/, Published Jun. 1, 2017.

Brearty et al., "The Performance Cost of Preserving Data/Query Privacy Using Searchable Symmetric Encryption", Retrieved From https://onlinelibrary.wiley.com/doi/full/10.1002/sec.1699, Published Nov. 10, 2016.

Nikitin etal., "Reducing Metadata Leakage from Encrypted Files and Communication with PURBs," Proceedings on Privacy Enhancing Technologies; Published 2019 (Year: 2019).

* cited by examiner

SECURE, EFFICIENT, AND FLEXIBLE SEARCHABLE-ENCRYPTION TECHNIQUES

BACKGROUND

Client-side encryption is a cryptographic technique that encrypts data on a client device or application before transmitting the encrypted data to a data storage service provider, e.g., a cloud-based data storage service provider, for data storage. Client-side encryption allows for the creation of data storage services and applications whose providers cannot access their client's data in plaintext, thus offering a higher level of privacy and security. For example, a client may encrypt its data using a cryptographic key that is not available to the data storage service provider and transmit only the encrypted data to the data storage service provider for storage, making it difficult for the data storage service provider (or an attacker) to decrypt the encrypted data or otherwise access the client's data in plaintext.

There are, however, some security, functionality, and efficiency challenges associated with client-side encryption, particularly with respect to the abilities to provide data searches. For example, a client that encrypts its data and transmits the encrypted data to a data storage service for storage may later wish to use the data storage service to perform a search (e.g., a search for customers who are located within a particular region, a search for customers having a certain name, etc.). The data storage service should therefore provide the ability to search for particular text or content as requested by a client. However, because the data storage service only has access to the encrypted customer data (i.e., unreadable data), the data storage service may not be able to carry out meaningful searches for the client. As a result, technological problems arise because the goals of data security and searchability directly conflict.

There are thus needs for technological solutions to provide, facilitate, and process search requests in data storage services that support client-side encryption without requiring decryption of the encrypted data, accessing the client's data in plaintext, or otherwise compromising the integrity of client-side encryption. As discussed below, technological solutions should be secure, efficient, and promote usability by clients who have encrypted certain data for storage.

SUMMARY

The embodiments described below relate to implementing, as a microservice at a client, a searchable-encryption service. For example, in an example embodiment there may be a non-transitory computer readable medium including instructions that, when executed by at least one processor, cause the at least one processor to perform operations for implementing, as a microservice at a client, a searchable-encryption service. The operations may comprise executing the microservice at the client to perform operations including: encrypting data based on a cryptographic key accessible to the client; sending the encrypted data to a network storage resource; identifying, at the microservice, a search query in plaintext; encrypting the search query according to the cryptographic key; sending the encrypted search query to the network storage resource; and receiving a response to the encrypted search query from the network storage resource.

According to some embodiments, the microservice operates in a stateless manner on the client.

According to some embodiments, the microservice is deployed at the client as part of a virtualized environment scaling process.

According to some embodiments, the client has exclusive control over the data.

According to some embodiments, the client has exclusive control over destruction of the data, e.g., by destroying the encryption key that only the client has.

According to some embodiments, the data is a concatenation of a plurality of database elements.

According to some embodiments, encrypting the data based on the cryptographic key includes separately encrypting the plurality of database elements.

According to some embodiments, encrypting the data based on the cryptographic key includes encrypting, as a group, the plurality of database elements.

According to some embodiments, the client creates the cryptographic key.

According to some embodiments, the client obtains the cryptographic key from an external key resource. For example, the client may obtain the cryptographic key from an encryption service on the client side that has the capability to generate cryptographic keys.

Additional embodiments relate to a computer-implemented method for implementing, as a microservice at a client, a searchable-encryption service. The method may comprise executing the microservice at the client to perform operations including: encrypting data based on a cryptographic key accessible to the client; sending the encrypted data to a network storage resource; identifying, at the microservice, a search query in plaintext; encrypting the search query according to the cryptographic key; sending the encrypted search query to the network storage resource; and receiving a response to the encrypted search query from the network storage resource.

According to some embodiments, the network storage resource does not have access to the cryptographic key.

According to some embodiments, the network storage resource is configured to query stored encrypted data based on the encrypted search query.

According to some embodiments, the client has exclusive control over the data.

According to some embodiments, the client has exclusive control over destruction of the data.

According to some embodiments, the data is a concatenation of a plurality of database elements.

According to some embodiments, encrypting the data based on the cryptographic key includes separately encrypting the plurality of database elements.

According to some embodiments, encrypting the data based on the cryptographic key includes encrypting, as a group, the plurality of database elements.

According to some embodiments, the client creates the cryptographic key.

According to some embodiments, the client obtains the cryptographic key from an external key resource.

Additional disclosed embodiments relate to dynamically changing an encryption technique for encrypted data to be stored in a searchable database. For example, in an example embodiment there may be a non-transitory computer readable medium including instructions that, when executed by at least one processor, cause the at least one processor to perform operations for dynamically changing an encryption technique for encrypted data to be stored in a searchable database. The operations may comprise receiving encrypted data for storage in the searchable database, the encrypted data having been encrypted by a client using a cryptographic key based on an encryption alteration scheme; receiving a search query from the client, the search query comprising a plurality of search strings including at least: an encrypted version of a plaintext string that was encrypted by the client using the cryptographic key, and one or more encrypted versions of the plaintext string that were encrypted by the client using one or more other cryptographic keys; processing the search query; and returning a response to the search query to the client.

According to some embodiments, the encryption alteration scheme comprises selecting the cryptographic key from among a set of cryptographic keys including the one or more other cryptographic keys.

According to some embodiments, the cryptographic key was chosen randomly among the set of cryptographic keys.

According to some embodiments, the encryption alteration scheme comprises encrypting the plaintext string with each of the cryptographic key and the one or more other cryptographic keys.

According to some embodiments, the search query from the client includes versions of the plaintext string encrypted with each of the cryptographic key and the one or more other cryptographic keys.

According to some embodiments, processing the search query comprises querying the searchable database based on each of the versions.

Additional embodiments relate to dynamically changing an encryption technique for encrypted data to be stored in a searchable database. For example, in some embodiments there may be a computer-implemented method for dynamically changing an encryption technique for encrypted data to be stored in a searchable database, the method comprising: receiving encrypted data for storage in the searchable database, the encrypted data having been encrypted by a client using a cryptographic key based on an encryption alteration scheme; receiving a search query from the client, the search query comprising a plurality of search strings including at least: an encrypted version of a plaintext string that was encrypted by the client using the cryptographic key, and one or more encrypted versions of the plaintext string that were encrypted by the client using one or more other cryptographic keys; processing the search query; and returning a response to the search query to the client.

According to some embodiments, the client creates the cryptographic key.

According to some embodiments, the client obtains the cryptographic key from an external key resource.

According to some embodiments, different portions of the received encrypted data for storage in the searchable database have been encrypted using at least two of: the cryptographic key and the one or more other cryptographic keys.

According to some embodiments, the response returned to the client includes encrypted data stored in the searchable database matching at least a portion of the search query.

According to some embodiments, the client is configured to decrypt the response returned to the client using at least one of: the cryptographic key or the one or more other cryptographic keys.

Additional disclosed embodiments relate to dynamically changing an encryption technique for encrypted data to be stored in a searchable database. For example, in some embodiments there may be a non-transitory computer readable medium including instructions that, when executed by at least one processor, cause the at least one processor to perform operations for dynamically changing an encryption technique for encrypted data to be stored in a searchable database, the operations comprising: sending encrypted data for storage in the searchable database, the encrypted data having been encrypted by a client using a cryptographic key based on an encryption alteration scheme; formulating a search query, the search query comprising a plurality of search strings including at least: an encrypted version of a plaintext string that was encrypted by the client using the cryptographic key, and one or more encrypted versions of the plaintext string that were encrypted by the client using one or more other cryptographic keys; sending the search query to the searchable database; and receiving a response to the search query from the searchable database.

According to some embodiments, the encryption alteration scheme comprises selecting the cryptographic key from among a set of cryptographic keys including the one or more other cryptographic keys.

According to some embodiments, the cryptographic key was chosen randomly among the set of cryptographic keys.

According to some embodiments, the encryption alteration scheme comprises encrypting the plaintext string with each of the cryptographic key and the one or more other cryptographic keys.

According to some embodiments, the search query includes versions of the plaintext string encrypted with each of the cryptographic key and the one or more other cryptographic keys.

According to some embodiments, the searchable database is configured to perform a query based on each of the versions.

According to some embodiments, different portions of the encrypted data sent to the searchable database have been encrypted using at least two of: the cryptographic key and the one or more other cryptographic keys.

According to some embodiments, the client is configured to decrypt the response to the search query using at least one of: the cryptographic key or the one or more other cryptographic keys.

According to additional disclosed embodiments, techniques are described for performing secure and flexible searches of encrypted data. For example, according to some embodiments, there may be a non-transitory computer readable medium including instructions that, when executed by at least one processor, cause the at least one processor to perform operations for performing secure and flexible searches of encrypted data. The operations may comprise maintaining a database of a plurality of sets of encrypted data; receiving a transformed search query for the database, the transformed search query having undergone a transformation process at a client including: identifying a plaintext string in a search query at the client, applying the plaintext string to a language dictionary accessible to the client, receiving, based on the language dictionary, one or more plaintext search strings, and encrypting, at the client, the one or more plaintext search strings; and returning a result based on the transformed search query, the result being based on the encrypted one or more plaintext search strings.

According to some embodiments, the plaintext string applied to the client-side language dictionary is a search prefix.

According to some embodiments, the applying of the plaintext string to the client-side language dictionary is a similarity-based search.

According to some embodiments, the receiving includes receiving a plurality of plaintext search strings and the encrypting includes encrypting each of the plurality of plaintext search strings.

According to some embodiments, the language dictionary is at least one of: a definitional dictionary, a synonym dictionary, or a database schema dictionary.

According to some embodiments, the receiving includes receiving a plurality of plaintext search strings based on the plaintext string in the search query.

According to some embodiments, the plurality of plaintext search strings are presented to a user as selectable recommendations.

Additional disclosed embodiments relate to performing secure and flexible searches of encrypted data. For example, according to some embodiments there may be a computer-implemented method for performing secure and flexible searches of encrypted data. The method may comprise maintaining a database of a plurality of sets of encrypted data; receiving a transformed search query for the database, the transformed search query having undergone a transformation process at a client including: identifying a plaintext string in a search query at the client, applying the plaintext string to a language dictionary accessible to the client, receiving, based on the language dictionary, one or more plaintext search strings, and encrypting, at the client, the one or more plaintext search strings; and returning a result based on the transformed search query, the result being based on the encrypted one or more plaintext search strings.

According to some embodiments, the encrypting includes individually encrypting each of the one or more plaintext search strings.

According to some embodiments, the method further comprises concatenating database schema information together with at least one of the plaintext search strings.

According to some embodiments, the method further comprises returning a plurality of results based on the transformed search query.

Additional disclosed embodiments relate to performing secure and flexible searches of encrypted data. For example, according to some disclosed embodiments there may be a non-transitory computer readable medium including instructions that, when executed by at least one processor, cause the at least one processor to perform operations for performing secure and flexible searches of encrypted data. The operations may comprise sending encrypted data from a client to a database for storage at the database; formulating a transformed search query for the database, the formulating including: identifying a plaintext string in a search query, applying the plaintext string to a language dictionary accessible to the client, receiving, based on the language dictionary, one or more plaintext search strings, and encrypting, at the client, the one or more plaintext search strings; sending the transformed search query to the database for querying; and receiving a result based on the transformed search query.

According to some embodiments, the operations further comprise receiving a plurality of plaintext search strings based on the language dictionary.

According to some embodiments, the operations further comprise encrypting each of the plurality of plaintext search strings.

According to some embodiments, the transformed search query includes each of the encrypted plurality of plaintext search strings.

According to some embodiments, the operations further comprise receiving a plurality of results from the database based on the encrypted plurality of plaintext search strings.

According to some embodiments, the plaintext string applied to the client-side language dictionary is a search prefix.

According to some embodiments, the applying of the plaintext string to the client-side language dictionary is a similarity-based search.

According to some embodiments, the operations further comprise concatenating database schema information together with at least one of the plaintext search strings.

According to some embodiments, the operations further comprise encrypting the concatenated database schema information and the at least one of the plaintext search strings.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

Reference will now be made in detail to the disclosed embodiments, examples of which are illustrated in the accompanying drawings.

Figure 1:
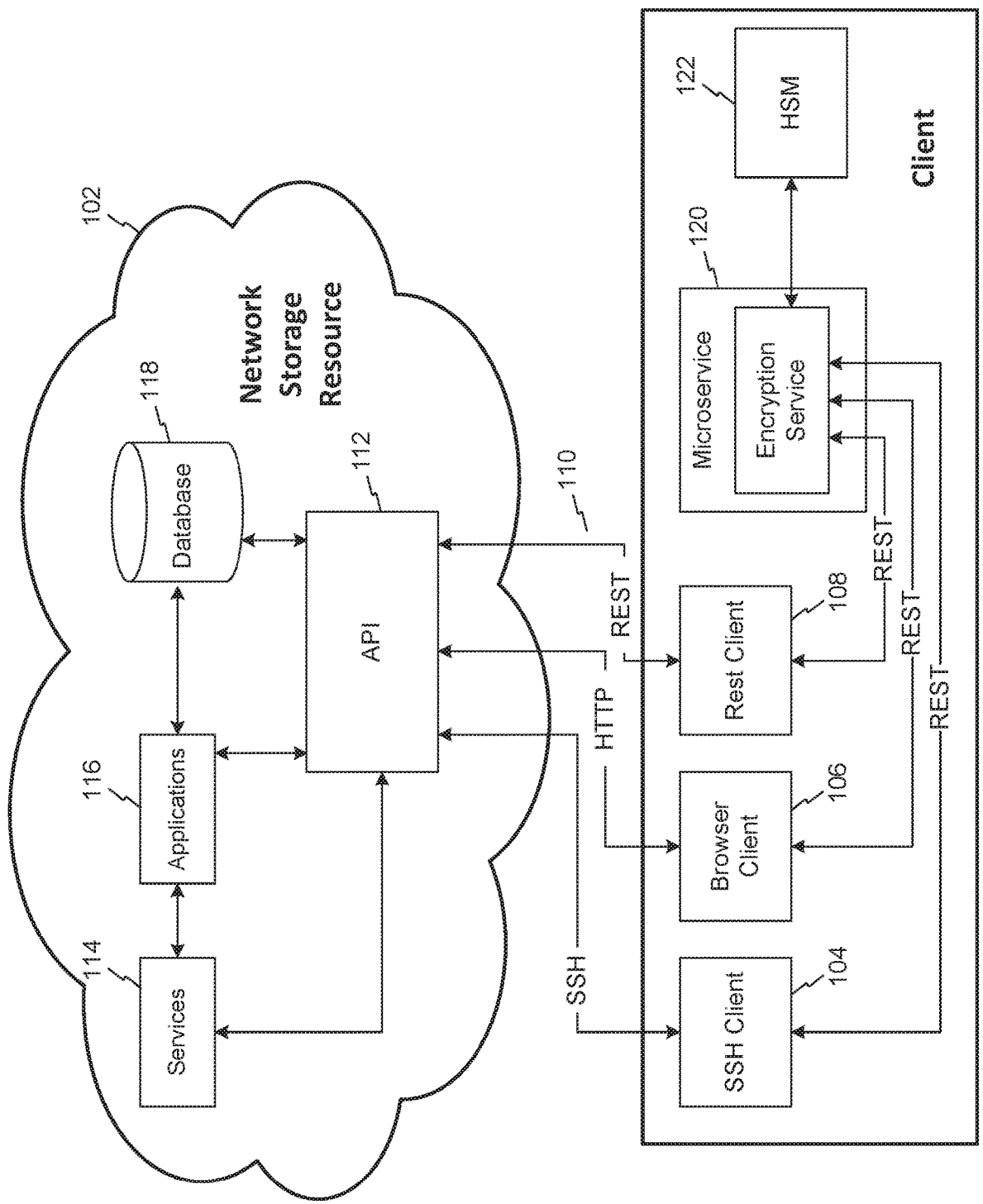
FIG. 1 is a block diagram of an example system in accordance with disclosed embodiments.

FIG. 1 is a block diagram of an example system 100 in accordance with disclosed embodiments. As shown, system 100 includes a network storage resource 102, e.g., a cloud-based data storage service, configured to provide data storage solutions for one or more clients 104-108. For example, network storage resource 102 may operate as a storage-as-a-service (SaaS) environment (e.g., AWS Cloud Drive™, Box™, Carbonite™, Microsoft OneDrive™, etc.), a web server environment, a database server environment, or others. In some embodiments, each client 104-108 may communicate with network storage resource 102 through one or more computing devices, each of which may host one or more client applications that use network storage resource 102 for data storage. Each computing device may be in communication with network storage resource 102 via one or more communication channels 110. A communication channel 110 may include a bus, a cable, a wireless communication channel, a radio-based communication channel, the Internet, a local area network (LAN), a wireless local area network (WLAN), a wide area network (WAN), a cellular communication network, or any Internet Protocol (IP), Secure Shell (SSH), Hypertext Transfer Protocol (HTTP), or Representational State Transfer (REST) based communication network and the like. In some embodiments, communication channel 110 may be based on public cloud infrastructure, private cloud infrastructure, hybrid public/private cloud infrastructure, or no cloud infrastructure. In such differing embodiments, network storage resource 102 and clients 104-108 may each be in the same, or in different, networks or network segments. In some embodiments, clients 104-108 may be equipped with one or more compatible communication interfaces configured to support communications with network storage resource 102 via communication channels 110. The communication interfaces are not shown in FIG. 1 for illustrative simplicity.

In some embodiments, network storage resource 102 may provide one or more application programming interfaces (APIs) 112 to support communications between network storage resource 102 and clients 104-108. In some embodiments, API 112 may provide clients 104-108 with access to various types of services 114 or applications 116 provided by network storage resource 102. In some embodiments, API 112 may also provide clients 104-108 with access to one or more databases 118 of network storage resource 102.

In some embodiments, network storage resource 102 may be configured to support client-side encryption. For example, network storage resource 102 may allow a client, e.g., client 104, to encrypt its data using a cryptographic key before sending the encrypted data to network storage resource 102. Clients 104-108 may want to do this when sending sensitive or private data to network storage resource 102 (e.g., personal data, medical data, financial data, business data, etc.). In such embodiments, network storage resource 102 may store the encrypted data received from client 104 in database 118, but network storage resource 102 may not have the ability to decrypt the stored data. In particular, network storage resource 102 may lack a cryptographic key the same as, or corresponding to, the client 104's cryptographic key used to encrypt the data. In this manner, network storage resource 102 may allow client 104 to handle data encryption and decryption on the client-side, which may reduce risks of data leakage from network storage resource 102, mitigate eavesdropping, and improve data security and integrity. Similarly, even if an attacker is able to compromise network storage resource 102, the attacker will not thereby gain access to the client 104's stored data in plaintext.

Client 104 may utilize various types of processes to encrypt and decrypt its data. For example, client 104 may configure a computer program referred to as a database driver (not shown in FIG. 1) to implement both a protocol for database connection and to handle data encryption and decryption for client 104. In another example, client 104 may send data to a proxy (not shown in FIG. 1), which may act as an intermediary for handling data encryption and decryption for client 104. In still another example, client 104 may deploy and manage a microservice 120 on the client-side to manage all required encryption and decryption services. The encryption by client 104 may be performed according to various techniques, such as asymmetric or symmetric encryption. Examples of asymmetric encryption techniques include RSA™ Diffie-Hellman, DSS, YAK, and various others. Examples of symmetric encryption techniques include AES, Blowfish, Twofish, DES, 3DES, and various others.

In some embodiments, client 104 may implement microservice 120 as an independently deployable service deployed for the discrete purpose of providing the required encryption and decryption services to client 104. For example, client 104 may deploy and manage microservice 120 on the same computing device that hosts the client application that uses network storage resource 102 for data storage. In this manner, client 104 may retain full control over microservice 120 and may allow the computing device to continue using its original communication channel 110 to communicate with network storage resource 102.

It is contemplated that using microservice 120 in this manner can enhance data security compared to using an intermediary service such as a proxy because the proxy may gain knowledge of the data types being communicated and may potentially be misused by malicious parties to impersonate client 104 and conduct attacks. Using microservice 120 in this manner also provides client 104 complete control over data that may go through encryption services, the control of which is lacking when using a proxy. For example, in a solution where not all data must be encrypted, client 104 may wish to only encrypt data that is sensitive and leave the rest unencrypted. If microservice 120 is used, client 104 may decide to not send certain data to microservice 120 for encryption. On the other hand, if a proxy is used, client 104 may be required to send all data through the proxy and the proxy has the knowledge of what to encrypt and what not to encrypt. Therefore, using microservice 120 may be more advantageous compared to using a proxy in such solutions because microservice 120 allows client 104 to send data that does not need to be encrypted directly to network storage resource 102, thereby improving performance. Furthermore, microservice 120 allows each client to keep and maintain control over their data and the abilities to make decisions on treatment of their own data, which may be appreciated by various clients for various reasons.

Furthermore, microservice 120 may be more robust compared to database drivers. Specifically, because microservice 120 can be deployed and managed by client 104, who also has knowledge of the client application that uses network storage resource 102 for data storage, client 104 can deploy microservice 120 in a manner that further enhances data integrity (e.g., to enhance the integrity of an entire row, or several joined rows, in a relational database). Client 104 can also deploy microservice 120 to use blind-indexing to build indices that are more robust against information leakage, including, e.g., concatenating tables, fields, and value names to form hashed indices that are more difficult for attackers to decipher and allow more precise searching.

Alternatively, as depicted in FIG. 1, if one or more clients, e.g., clients 104-108, belong to the same organization or user group, the organization may deploy and manage microservice 120 on a computing device or a hardware security module (HSM) 122 and make microservice 120 accessible to clients 104-108. The organization may also exclude computing devices outside of the organization from accessing microservice 120. In this manner, clients 104-108 may utilize the encryption services provided by microservice 120 as described above, and clients 104-108 may still retain control over microservice 120 through the organization. Therefore, microservice 120 deployed in this manner may continue to allow clients 104-108 to use their original communication channels 110 to communicate with network storage resource 102, and may also provide benefits such as enhanced data security and robustness in the same manner described above.

Furthermore, in some embodiments, microservice 120 may be deployed to operate in a stateless manner. In contrast to a stateful application (e.g., using HTTP cookies, Java™ cookies, etc.), which refers to an application that saves client data from the activities of one session for use in the next session, a stateless microservice does not save client data generated in one session for use in the next. In other words, microservice 120 may be deployed to operate for the discrete purpose of encrypting or decrypting data provided to microservice 120 without the need to save any client data (e.g., in cookies) to facilitate its execution. Therefore, such a stateless microservice 120 can be deployed in a scalable setup, which can be better equipped to handle load increases. Moreover, in some embodiments, microservice 120 may be deployed on the client-side on one or more computing devices as a part of a virtualized environment scaling process (e.g., replicating instances of a virtualized machine or application).

Figure 2:
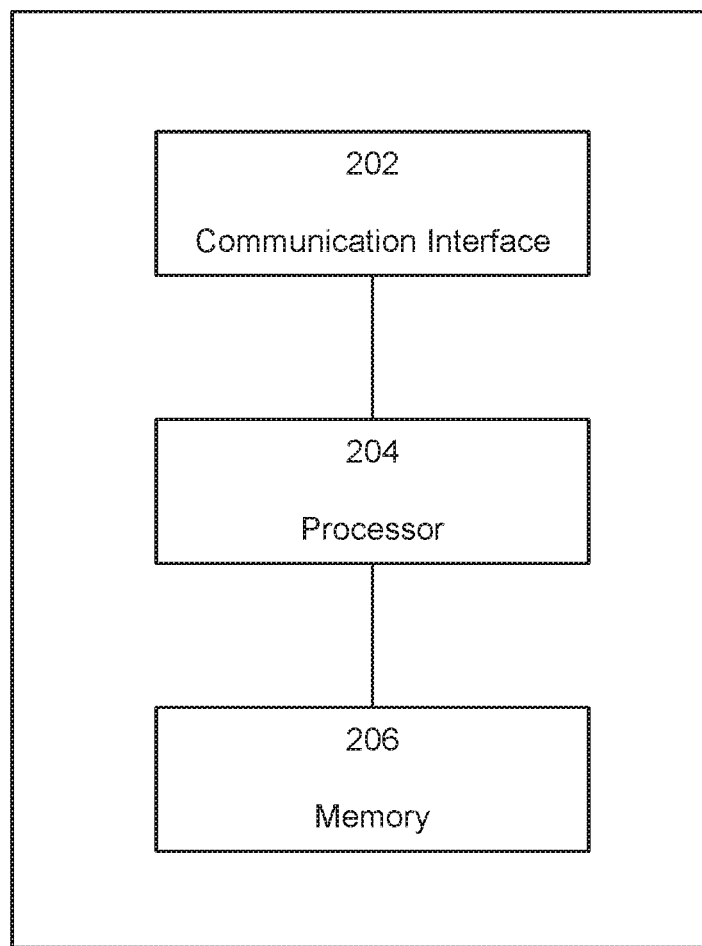
FIG. 2 is a block diagram of an example client device in accordance with disclosed embodiments.

FIG. 2 illustrates a block diagram of a computing device 200, which can be utilized to host one or more client applications or one or more microservices, in accordance with disclosed embodiments. Referring to FIG. 2, the computing device 200 may include a communication interface 202, a processor 204, and a memory 206, among potentially various other components.

The communication interface 202 may facilitate communications between computing device 200 and other computing devices or resources, including, e.g., network storage resource 102 (shown in FIG. 1). In some embodiments, communication interface 202 may be configured to support one or more communication standards, such as an Internet standard or protocol, an Integrated Services Digital Network (ISDN) standard, and the like. In some embodiments, communication interface 202 may include one or more of a LAN card, a cable modem, a satellite modem, a data bus, a cable, a wireless communication channel, a radio-based communication channel, a cellular communication channel, an Internet Protocol, a SSH, a HTTP, or a REST based communication device, or other communication devices for wired and/or wireless communications. In some embodiments, communication interface 202 may be based on public cloud infrastructure, private cloud infrastructure, or hybrid public/private cloud infrastructure.

Processor 204 may include one or more dedicated processing units, application-specific integrated circuits (ASICs), field-programmable gate arrays (FPGAs), or various other types of processors or processing units. Processor 204 may be coupled with memory 206 and configured to execute instructions stored in memory 206.

Memory 206 may store processor-executable instructions and data. Memory 206 may include any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk. When the instructions in memory 206 are executed by processor 204, computing device 200 may perform operations for implementing an encryption service that can be used to facilitate data storage and data searches. The encryption service may be implemented in a database driver, a proxy, or a microservice.

Continuing with the example above, where network storage resource 102 is configured to support client-side encryption and may therefore allow a client, e.g., client 104, to encrypt its data before sending the encrypted data to network storage resource 102 for storage. If client 104 wants to store data, e.g., customer data {id:"1234"; name:"Jon"; country: "United States"} on network storage resource 102, client 104 may utilize the encryption service (e.g., part of microservice 120) to encrypt the data based on a cryptographic key accessible to client 104 to produce encrypted data {id:U4sOetRzC-M2F6DxqQ; name: nPIQ5mSGYzppywqSx; country:P0r-cOwTu6szXokZHW} and send the encrypted data to network storage resource 102 for storage. Network storage resource 102, upon receiving the encrypted data, may store the encrypted data in database 118. In some embodiments, only the raw encrypted data may be stored. In further embodiments, the encrypted data may be stored in associated with an identifier of the client 104 (e.g., a user identifier, application identifier, account name, IP address, MAC address, etc.). Further, in some embodiments the encrypted data may be stored according to the types of encrypted data being stored (e.g., in the above example, "id," "name," and "country"). In this manner, while the actual data contents may be encrypted, the type or category of data may be known to the network storage resource 102 to facilitate more particularized searching later by client 104.

If client 104 later wishes to use network storage resource 102 to search for customers who are located in the United States, for example, client 104 may define a search query in plaintext (e.g., SELECT*FROM customer WHERE country="United States") and utilize the encryption service (e.g., of microservice 120) to encrypt the search query based on the same cryptographic key. In this manner, the encryption service can generate an encrypted search query to search for customers whose country matches the encrypted value of "United States," which corresponds to "P0r-cOwTu6szXokZHW" in the above example. Client 104 may then send the encrypted search query (e.g., SELECT*FROM customer WHERE country="P0r-cOwTu6szXokZHW") to network storage resource 102 and expect to receive a response from network storage resource 102 containing encrypted data representing customers whose country matches "P0r-cOwTu6szXokZHW." In this manner, network storage resource 102 can successfully process search queries submitted by client 104 without needing to decrypt the encrypted data, access the client's data in plaintext, or otherwise compromise the integrity of client-side encryption. Upon receiving the response, client 104 may decrypt the encrypted data contained in the response on the client-side to obtain the data in plaintext.

It is to be understood that the data and the search query described above are merely exemplary and are not meant to be limiting. It is contemplated that client 104 may store various types of data in network storage resource 102, and in some embodiments, client 104 may store the various types of data in one or more database tables as one or more database elements. In some embodiments, if the data to be stored contains multiple database elements or is a concatenation of multiple database elements, the encryption service may be configured to separately encrypt the database elements based on the cryptographic key. Alternatively, the encryption service may be configured to encrypt multiple database elements based on the cryptographic key as a group.

Client 104 may continue to have control over its data stored in network storage resource 102. For example, client 104 may control the insertion, modification, and removal of its data stored in network storage resource 102. Client 104 may also control whether other users have permission to query its data. In some embodiments, client 104 may have exclusive control over its data, including destruction of its data. Client 104 may destroy its data by permanently removing it from network storage resource 102. Client 104 may also destroy its data by modifying it so that it cannot be decrypted or is no longer meaningful.

Figure 3:
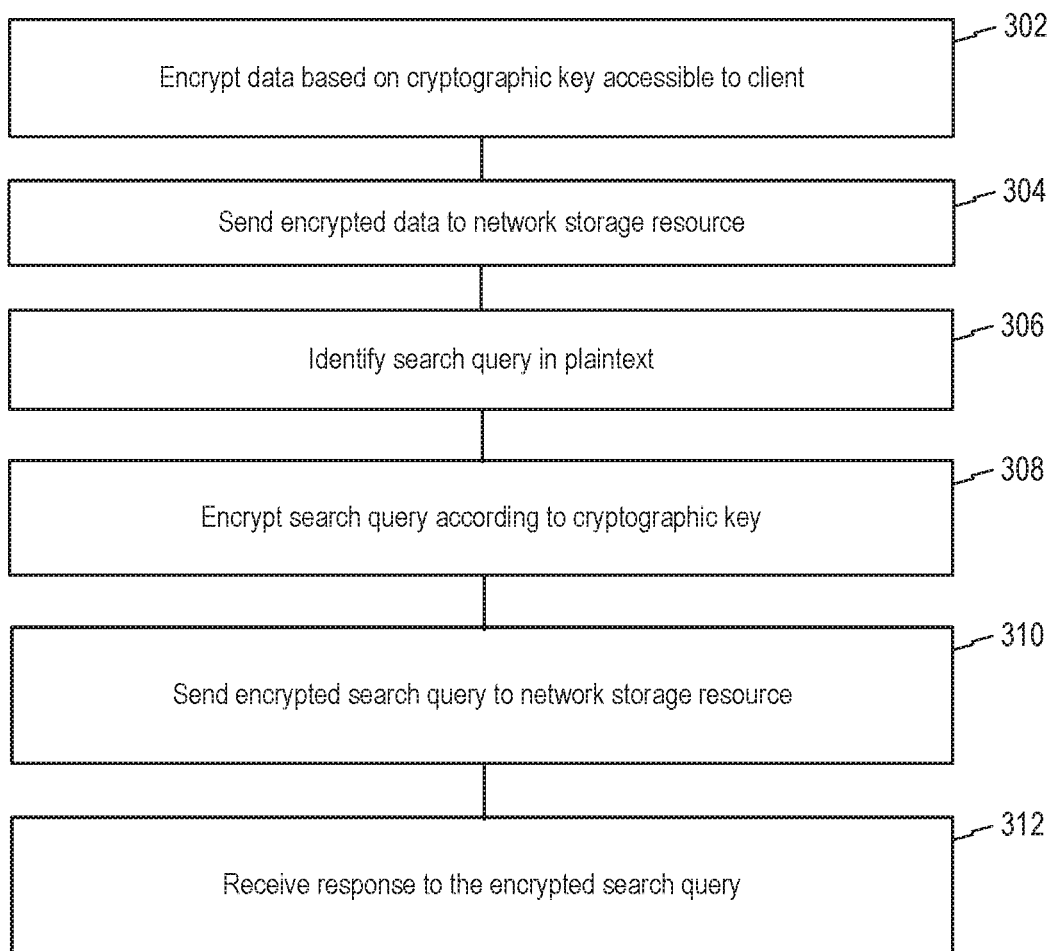
FIG. 3 is an exemplary flowchart showing a process for implementing a searchable-encryption service in accordance with disclosed embodiments.

Referring now to FIG. 3, an exemplary flowchart showing a process 300 for implementing a searchable-encryption service is shown. In accordance with above embodiments, process 300 may be implemented in system 100 depicted in FIG. 1. For example, process 300 may be performed by a microservice, e.g., microservice 120, at a client, e.g., client 104.

At step 302, process 300 may execute the microservice to encrypt data based on a cryptographic key accessible to the client. As discussed above, the client's cryptographic key may be an asymmetric key or a symmetric key, for example. As a further example, the cryptographic key may in some embodiments be generated based on biometric (e.g., fingerprint) or biological (e.g., hair follicle) data of a user of client 104. At step 304, process 300 may execute the microservice to send the encrypted data to a network storage resource, e.g., network storage resource 102, for storage. As discussed above, in some embodiments all of the data transmitted to network storage resource 102 is encrypted. Alternatively, in some embodiments at least some data (e.g., data classifications, types, categories, field names, etc.) may be kept in plaintext as transmitted to network storage resource 102, to enable more efficient and precise searching at network storage resource 102. At step 306, process 300 may execute the microservice to identify, at the microservice, a search query in plaintext. The search query may be provided by the client (e.g., by a user) to search for data stored in the network storage resource 102. In some embodiments the search may be a simple plaintext search string. Alternatively, the search may include parameters for enabling more efficient and precise searching as well (e.g., data classifications, types, categories, field names, etc.). At step 308, process 300 may execute the microservice to encrypt the search query according to the cryptographic key. As discussed above, in some embodiments all of the search query may be encrypted. Alternatively, in some embodiments certain fields (e.g., data classifications, types, categories, field names, etc.) may remain in plaintext while the search content itself may be encrypted. At step 310, process 300 may execute the microservice to send the encrypted search query to the network storage resource 102. Consistent with above embodiments, the encrypted search query may be transmitted over communications path 110 (e.g., from microservice 120 itself, or from a client 104-108 itself). The network storage resource 102 may query stored encrypted data it maintains (e.g., in database 118) based on the encrypted search query. As discussed above, if certain fields (e.g., data classifications, types, categories, field names, etc.) are unencrypted in the search query, they may be used to facilitate the search at database 116 and make the search more precise and efficient. At step 312, process 300 may execute the microservice to receive a response to the encrypted search query from the network storage resource 102. For example, the network storage resource 102 may return the encrypted data it stores that matches the client 104's search query.

In some embodiments, the network storage resource 102 is configured to have no access to the cryptographic key used by the client 104. In this manner, the network storage resource 102 can process encrypted search queries without compromising the integrity of client-side encryption. In some embodiments, the client 104 may create its own cryptographic key, according to the techniques noted above (e.g., asymmetric, symmetric, biometric, biological, etc.), which may be used by the microservice 120 to encrypt data and search queries provided by the client 104. Alternatively, in some embodiments, the client 104 may obtain its cryptographic key from one or more external key resources. Furthermore, in some embodiments, different clients 104-108 may use different cryptographic keys. However, if one or more clients 104-108 belong to the same organization or user group, the organization may create or obtain a cryptographic key, which may be shared by one or more clients 104-108.

In some embodiments, once a client 104 creates or obtains its cryptographic key (which may be obtained, e.g., from an external key resource or from an organization the client belongs to), that client 104 may use the same cryptographic key to encrypt all of its data and search queries. Using the same cryptographic key in this manner ensures that a given plaintext value will always encrypt to the same encrypted value, making the encryption deterministic, which in turn reduces the complexity of the searchable-encryption service described above.

There are, however, some potential shortcomings associated with basic deterministic encryption. One shortcoming is the possibility that a malicious party may be able to observe the behaviors of the deterministic encryption occurring in the database (e.g., database 118), or on the communication channel (e.g., channel 110), which may allow the malicious party to deduce knowledge on the client 104's business. For example, if the malicious party knows that a client 104 usually stays late at work, and if the malicious party has access to view the database 118, the malicious party may watch the database 118 at late hours and deduce that the changing database rows relate to activities associated with the client 104. This potential shortcoming can be mitigated utilizing one or more processes described below.

Figure 4:
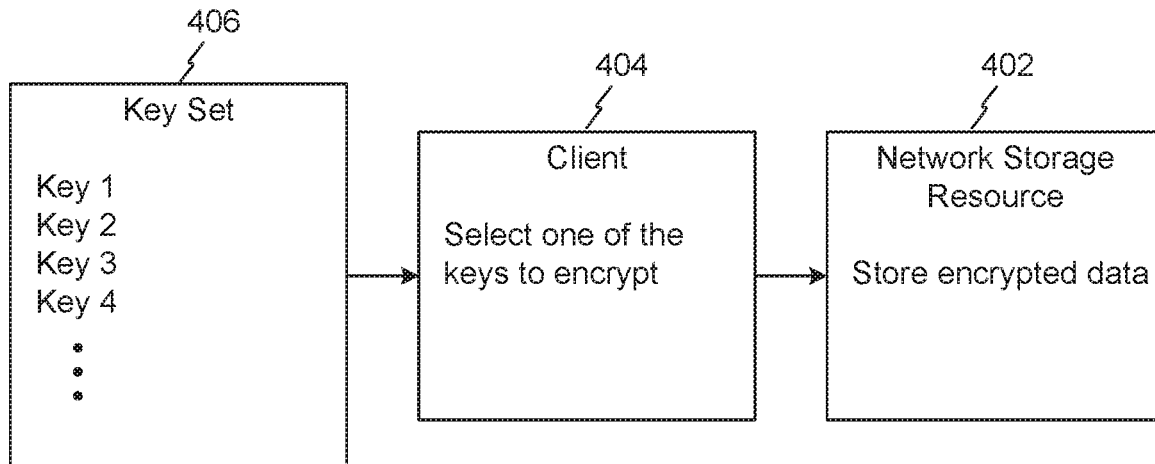
FIG. 4 is an illustration of a process for dynamically changing an encryption technique for encrypted data to be stored in a searchable database in accordance with disclosed embodiments.
Figure 5:
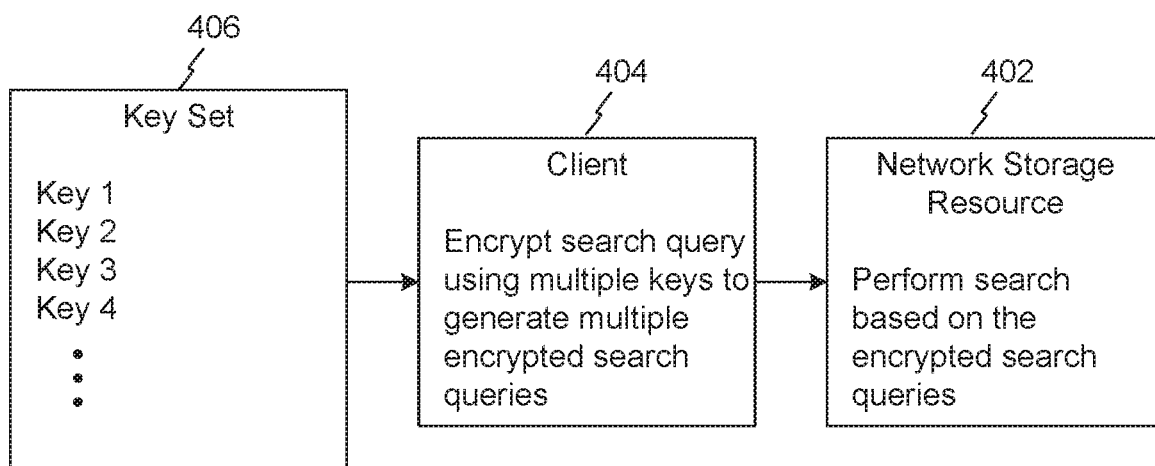
FIG. 5 is an illustration of a process for dynamically changing an encryption technique for encrypted data to be stored in a searchable database in accordance with disclosed embodiments.

Referring now to FIGS. 4 and 5, these figures are illustrations depicting a process for dynamically changing an encryption technique for encrypted data to be stored in a searchable database, e.g., database 118 (shown in FIG. 1), in accordance with disclosed embodiments. As shown in FIG. 4, a client 404 (e.g., similar to any of clients 104-108) may create or obtain a set of cryptographic keys 406 that can be used to encrypt data and search queries. As discussed above, the cryptographic keys in the set 406 may be generated according to various cryptographic techniques (e.g., asymmetric keys, symmetric keys, biometric-based keys, biological-based keys, etc.). If client 404 wants to store data, e.g., customer data {id:"1234"; name:"Jon"; country:"United States"} on the network storage resource 402, client 404 may select a key, e.g., Key 3, from the set of cryptographic keys 406, utilize Key 3 to encrypt some or all of the data, and send the encrypted data to network storage resource 402 for storage. As discussed above, either all of the data may be encrypted using Key 3, or only portions thereof (e.g., encrypting the data contents but not certain field names, categories, classifications, types, headers, etc.). In some embodiments, client 404 may randomly select a key from among the set of cryptographic keys 406.

As shown in FIG. 5, if client 404 later wishes to use network storage resource 402 to search for customers who are located in the United States, for example, client 404 may define a search query in plaintext (e.g., SELECT*FROM customer WHERE country="United States") and utilize the encryption service to encrypt the search query using all keys contained in the set of cryptographic keys 406. In this manner, the encryption service can generate a corresponding encrypted search query based on each key contained in the set of cryptographic keys 406. Client 404 may then send all such encrypted search queries to network storage resource 402 for processing. Of note is that only one of such encrypted search queries (i.e., the search query encrypted using the same key used to encrypt the data, or Key 3 in the example above) will produce matching results. In this manner, network storage resource 402 can successfully process search queries submitted by client 404 and provide a response to the client 404. The response may include encrypted data stored in network storage resource 402 that matches at least a portion of the encrypted search query. Upon receiving the response, client 404 may decrypt the encrypted data contained in the response on client-side using the keys contained in the set of cryptographic keys 406 to obtain the data in plaintext.

It is contemplated that the process described above may be utilized to handle not only insertion of new data, but also updates, removals, as well as other types of data processes. It is also contemplated that the process may be executed independently each time a data request is received. Continuing with the example above, if client 404 wants to store data, e.g., customer data {id:"1234"; name:"Jon"; country:"United States"} on network storage resource 402, client 404 may randomly select a first key, e.g., Key 3, from the set of cryptographic keys 406, to encrypt the data for insertion. If client 404 later wishes to update the data associated with "Jon" to indicate that "Jon" has moved to "Canada," client 404 may submit an update request (e.g., UPDATE customer SET country="Canada" WHERE name="Jon"), which may be encrypted using a second key randomly selected from the set of cryptographic keys 406. The first and second keys may or may not be the same.

It is noted that the purpose of changing the encryption technique for encrypted data is to mitigate the risks associated with deterministic encryption, which include the possibility that a malicious party may be able to observe the behaviors of the deterministic encryption occurring in the database or a communications channel between the client and the database. By changing the encryption techniques used to encrypt data, it may become more difficult for the malicious party to observe behaviors that can be used to carry out attacks, therefore further improving data security. Moreover, in some embodiments, keys contained in the set of cryptographic keys 406 may be subject to random rotations at random times, making it even more difficult or impossible for malicious parties to observe any behaviors that can be used to carry out attacks.

Furthermore, in some embodiments, client 404 may randomly select multiple keys from the set of cryptographic keys 406 to encrypt multiple portions of the data. For example, if client 404 wants to store data, e.g., customer data {id:"1234"; name:"Jon"; country:"United States"} on network storage resource 402, client 404 may randomly select a first key from the set of cryptographic keys 406 to encrypt "1234." Client 404 may also randomly select a second key from the set of cryptographic keys 406 to encrypt "Jon." Client 404 may further randomly select a third key from the set of cryptographic keys 406 to encrypt "United States." The first, second, and third keys may or may not be the same, according to their random selection.

Figure 6:
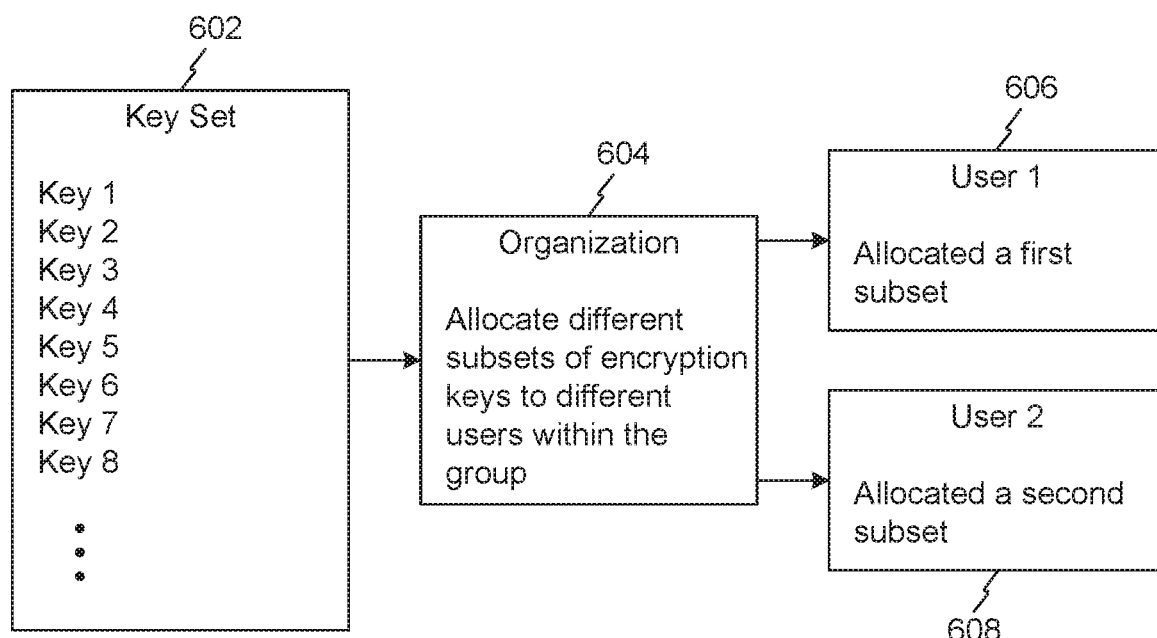
FIG. 6 is an exemplary flowchart showing a process for dynamically changing an encryption technique for encrypted data to be stored in a searchable database in accordance with disclosed embodiments.

It is to be understood that the processes for changing the encryption technique for encrypted data described above are merely exemplary and are not meant to be limiting. It is contemplated that other processes may be utilized to facilitate changing of encryption techniques for encrypted data without departing from the spirit and scope of the present disclosure. For instance, FIG. 6 is an illustration depicting another process for dynamically changing the encryption technique for encrypted data. As shown in FIG. 6, multiple users 606-608 may belong to the same organization or user group 604. In such a case, organization 604 may create or obtain a set of cryptographic keys 602 at the organization level, eliminating the need for each user 606-608 to independently spend resources to create, obtain, and maintain separate sets of cryptographic keys. Organization 604 may allow users 606-608 to use the keys contained in the set of cryptographic keys 602. Alternatively, organization 604 may allocate different subsets of cryptographic keys to different users 606-608, enabling each user 606-608 to use their corresponding subset of cryptographic keys in manners similar to that described above.

Figure 7:
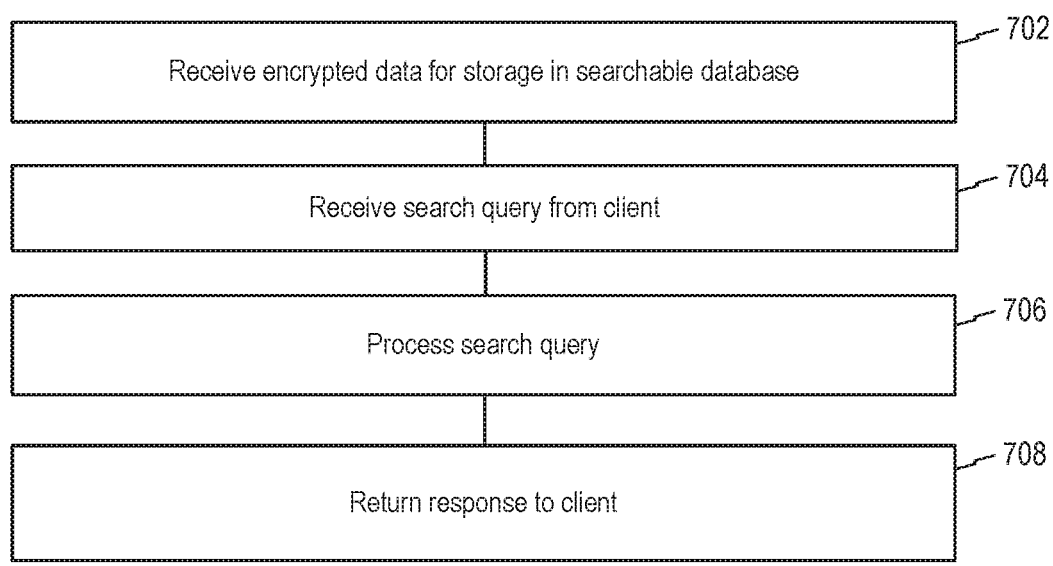
FIG. 7 is an exemplary flowchart showing a process for dynamically changing an encryption technique for encrypted data to be stored in a searchable database in accordance with disclosed embodiments.

Referring now to FIG. 7, an exemplary flowchart showing a process 700 for dynamically changing an encryption technique for encrypted data to be stored in a searchable database is shown. In accordance with above embodiments, process 700 may be implemented in system 100 depicted in FIG. 1. For example, process 700 may be performed by network storage resource 102 or a searchable database, e.g., database 118, of network storage resource 102.

At step 702, process 700 may receive encrypted data for storage in the searchable database. The encrypted data may have been encrypted by a client 104 using a cryptographic key based on an encryption alteration scheme. In some embodiments, the encryption alteration scheme may include selecting the cryptographic key from among a set of cryptographic keys (e.g., the set of cryptographic keys 406 shown in FIG. 4 or the set of cryptographic keys 602 shown in FIG. 6). The set of cryptographic keys may include one or more other cryptographic keys, and in some embodiments, the cryptographic key may be chosen randomly among the set of cryptographic keys.

At step 704, process 700 may receive a search query from the client. The search query may include one or multiple search strings, and in some embodiments, the search strings may include an encrypted version of a plaintext string that was encrypted by the client 104 using the cryptographic key and one or more encrypted versions of the plaintext string that were encrypted by the client 104 using one or more other cryptographic keys. Furthermore, in some embodiments, the plaintext string may be encrypted with each of the cryptographic key and the one or more other cryptographic keys. In such embodiments, the search query from the client 104 may include versions of the plaintext string encrypted with each of the cryptographic key and the one or more other cryptographic keys. Further, as discussed above, in some embodiments a portion of the search query (e.g., a field, category, classification, header, type, etc.) may be received at the network storage resource 102 in plaintext while the actual search contents itself may be encrypted.

At step 706, process 700 may process the search query. In some embodiments, processing the search query may include querying the searchable database 118 based on each of the versions of the plaintext string encrypted with each of the cryptographic key and the one or more other cryptographic keys. At step 708, process 700 may return a response to the search query to the client 104. Upon receiving the response, the client 104 may decrypt the encrypted data contained in the response on client-side using one of the keys contained in the set of cryptographic keys to obtain the data in plaintext.

Figure 8:
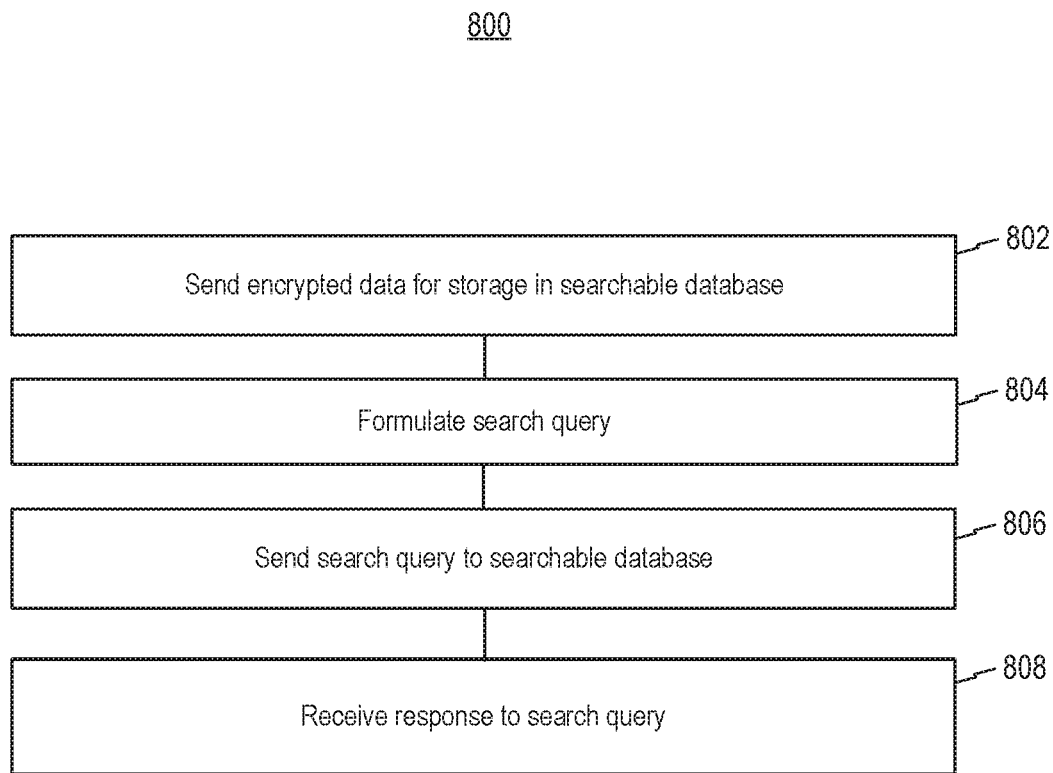
FIG. 8 is an illustration of a process for dynamically changing an encryption technique for encrypted data to be stored in a searchable database in accordance with disclosed embodiments.

Referring now to FIG. 8, an exemplary flowchart showing a process 800 for dynamically changing an encryption technique for encrypted data to be stored in a searchable database is shown. In accordance with above embodiments, process 800 may be implemented in system 100 depicted in FIG. 1. For example, process 800 may be performed by a computing device utilized by a client, e.g., client 104. Alternatively, process 800 may be performed separate from a client, such as at a proxy server intermediate between the client 104 and the network storage resource 102.

At step 802, process 800 may send encrypted data for storage in a searchable database 118 of a network storage resource 102. The encrypted data may have been encrypted by the client 104 using a cryptographic key based on an encryption alteration scheme, as discussed above. In some embodiments, the encryption alteration scheme may include selecting the cryptographic key from among a set of cryptographic keys (e.g., the set of cryptographic keys 406 shown in FIG. 4 or the set of cryptographic keys 602 shown in FIG. 6). The set of cryptographic keys may include one or more other cryptographic keys, and in some embodiments, the cryptographic key may be chosen randomly among the set of cryptographic keys. Furthermore, in some embodiments, different portions of the encrypted data may be encrypted using different keys contained in the set of cryptographic keys.

At step 804, process 800 may formulate a search query. The search query may include multiple search strings, and in some embodiments, the search strings may include an encrypted version of a plaintext string that was encrypted by the client 104 using the cryptographic key and one or more encrypted versions of the plaintext string that were encrypted by the client 104 using one or more other cryptographic keys. Furthermore, in some embodiments, the plaintext string may be encrypted with each of the cryptographic key and the one or more other cryptographic keys. In such embodiments, the search query from the client 104 may include versions of the plaintext string encrypted with each of the cryptographic key and the one or more other cryptographic keys.

At step 806, process 800 may send the search query to the searchable database 118. The searchable database 118 may process the search query by comparing the search query to contents of the database 118. If any plaintext fields, categories, classifications, or types are present in the search query, those may be used to facilitate the search at database 118. At step 808, process 800 may receive a response to the search query from the searchable database 118. Upon receiving the response, the client 104 may decrypt the encrypted data contained in the response on client-side using one of the keys contained in the set of cryptographic keys to obtain the data in plaintext.

It is contemplated that there may be situations where a client 104 may wish to use the searchable database 118 to search for data records that do not match the search query exactly. For example, a client 104 may wish to use the searchable database 118 to search for customers with names that start with "Jon," including, e.g., Jon, Jonna, Jones, Jonathan, etc. This may be achieved using wild characters or regular expressions in the search query, which may be defined as, e.g., SELECT*FROM customer WHERE name="Jon*", where "*" is a wild character representing zero or more characters. However, because this search query must go through an encryption process as described above in order to be processed, the encryption process will create an encrypted search query that is only capable of locating encrypted data records that have the encrypted values in the "name" field that match the encrypted value of "Jon*". In other words, this encrypted search query may not be able to retrieve the records with names such as Jon, Jonna, Jones, or Jonathan. This limitation can be addressed using one or more processes described below.

Figure 9:
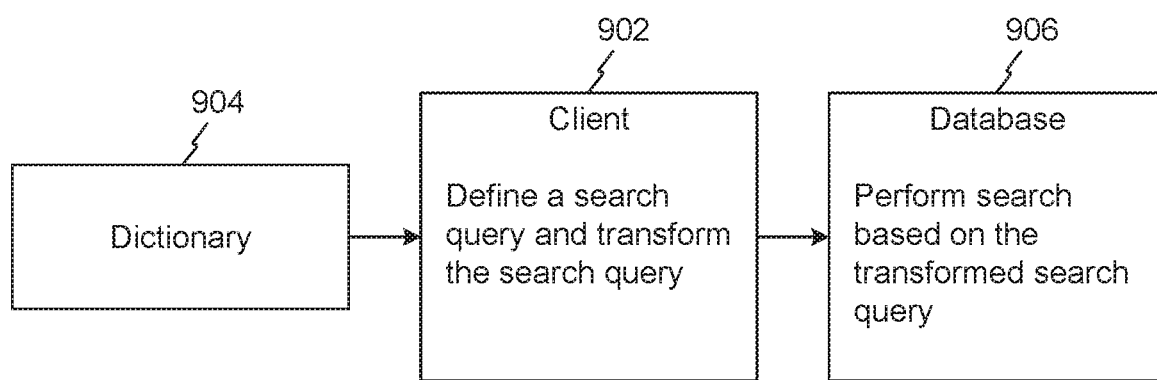
FIG. 9 is an illustration of a process for performing secure and flexible searches of encrypted data in accordance with disclosed embodiments.

FIG. 9 is an illustration depicting a process for performing secure and flexible searches of encrypted data in accordance with disclosed embodiments. As shown in FIG. 9, a client 902 may first define a search query. In some embodiments, the search query may be defined in plain text, e.g., SELECT*FROM customer WHERE name="Jon*". Client 902 may then transform the search query, and in some embodiments, client 902 may apply the search query to a language dictionary 904 accessible to client 902. Dictionary 904 may provide client 902 with a list of alternative search terms, e.g., names that start with "Jon," including, e.g., Jon, Jonna, Jones, Jonathan, etc., and help client 902 to generate one or more plaintext search strings, including, e.g., SELECT*FROM customer WHERE name="Jon", SELECT*FROM customer WHERE name="Jonna", SELECT*FROM customer WHERE name="Jones", SELECT*FROM customer WHERE name="Jonathan", etc. Client 902 may then encrypt each plaintext search string in manners described above and send the encrypted search strings to a searchable database 906 for processing.

Searchable database 906 may be implemented as database 118 of network storage resource 102 shown in FIG. 1. Searchable database 906 may process each encrypted search string in manners described above and provide a response to client 902 containing encrypted data records with names matching the encrypted values of "Jon," "Jonna," "Jones," "Jonathan," etc. Upon receiving the response, client 902 may decrypt the encrypted data records contained in the response on the client-side to obtain the data in plaintext.

It is to be understood that the support for wild characters and regular expressions described above are merely exemplary and are not meant to be limiting. It is contemplated that dictionary 904 may be configured to support other types of flexible searches without departing from the spirit and scope of the present disclosure. For example, in some embodiments, dictionary 904 may provide client 902 with alternative search terms based on their likeliness to the search term client 902 defined in the original search query (e.g., based on spelling or phonetic similarities). In another example, dictionary 904 may provide client 902 with alternative search terms based on the meaning (e.g., synonyms) of the search term client 902 defined in the original search query.

In some embodiments, client 902 may provide training data to dictionary 904 to help dictionary 904 build and expand a library of alternative search terms. Such training data may include, e.g., a client profile, a client website, as well as other documents or data records that may help dictionary 904 build and expand its library. In some embodiments, dictionary 904 may include one or more definitional dictionaries, synonym dictionaries, product listings or inventories, or database schema dictionaries to help build and expand the library of alternative search terms. Dictionary 904 may also be configured to utilize various types of machine learning techniques to learn from search queries provided by client 902, including historic search queries. In this manner, dictionary 904 may tailor the library to serve specific needs of client 902. In some embodiments, dictionary 904 may be configured to receive feedback from the client 902, further improving the relatedness of the alternative search terms provided by dictionary 904 to the client 902. Examples of dictionaries that may be used with the disclosed techniques include "wordfuzz," available on GitHub™, or "WordNet," available from Princeton University's website.

Figure 10:
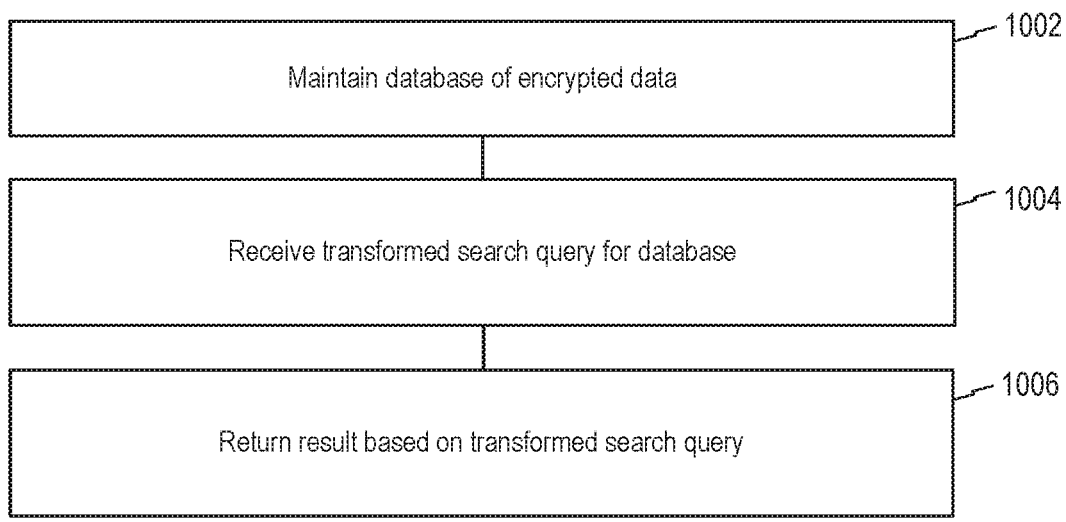
FIG. 10 is an exemplary flowchart showing a process for performing secure and flexible searches of encrypted data in accordance with disclosed embodiments.

Referring now to FIG. 10, an exemplary flowchart showing a process 1000 for performing secure and flexible searches of encrypted data is shown. In accordance with above embodiments, process 1000 may be implemented in system 100 depicted in FIG. 1. For example, process 1000 may be performed by network storage resource 102 or a searchable database, e.g., database 118, of network storage resource 102.

At step 1002, process 1000 may maintain a database, e.g., database 118, which may record multiple sets of encrypted data. At step 1004, process 1000 may receive a transformed search query for the database 118. The transformed search query may have undergone a transformation process at a client, e.g., client 104 shown in FIG. 1 or client 902 shown in FIG. 9. Alternatively, as discussed above, the transformation process may occur separate from the client (e.g., at a proxy server between the client 104 and the network storage resource 102). In some embodiments, the transformation process may identify a plaintext string in a search query at the client 104. Continuing with the example above, the plaintext string in the search query may include, e.g., SELECT*FROM customer WHERE name="Jon*". The client 104 may apply the plaintext string to a language dictionary accessible to the client (e.g., dictionary 904 as shown in FIG. 9) and receive, based on the language dictionary, one or more plaintext search strings. In some embodiments, the plaintext search strings may be based on the plaintext string in the search query. Such plaintext search strings may include, e.g., SELECT*FROM customer WHERE name="Jon", SELECT*FROM customer WHERE name="Jonna", SELECT*FROM customer WHERE name="Jones", SELECT*FROM customer WHERE name="Jonathan", etc. The client 104 may encrypt each of these plaintext search strings and send the encrypted search strings as the transformed search query to the database 118 for processing. Alternatively, the plaintext search strings may be presented to the client 104 as selectable recommendations. In such embodiments, the client 104 may select and encrypt one or more plaintext search strings and send the one or more encrypted search strings as the transformed search query to the database 118 for processing. Furthermore, in some embodiments, the client 104 may concatenate certain database schema information together with one or more plaintext search strings and encrypt the concatenated database schema information and the plaintext search strings to formulate the transformed search query.

At step 1006, process 1000 may return a result based on the transformed search query. In some embodiments, the result may be generated based on the encrypted one or more plaintext search strings. Continuing with the example above, process 1000 may process each encrypted search string in manners described above and generate the result containing encrypted data records with names matching the encrypted values of "Jon," "Jonna," "Jones," "Jonathan," etc. Upon receiving the result, the client 104 may decrypt the encrypted data records on client-side to obtain the data in plaintext.

In some embodiments, the plaintext string applied to the language dictionary may include a search prefix. In some embodiments, the language dictionary may be configured to support other types of flexible searches. For example, in some embodiments, the language dictionary may apply a similarity-based search. In some embodiments, the language dictionary may include one or more definitional dictionaries, synonym dictionaries, or database schema dictionaries to help build and expand the library of alternative search terms.

Figure 11:
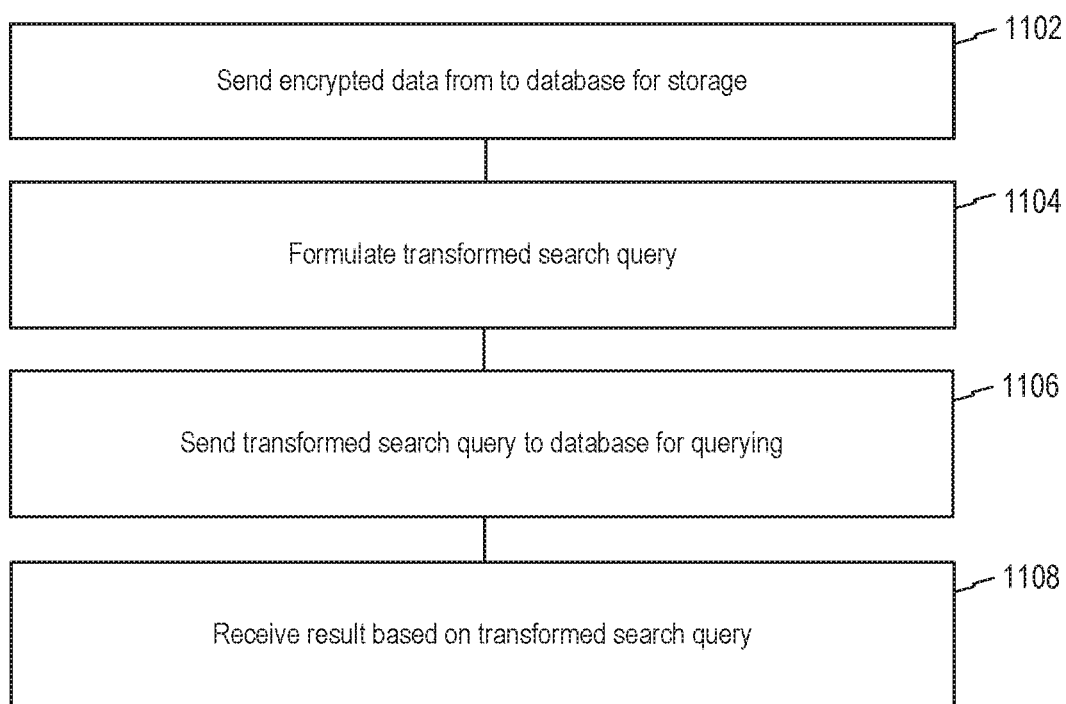
FIG. 11 is an exemplary flowchart showing a process for performing secure and flexible searches of encrypted data in accordance with disclosed embodiments.

Referring now to FIG. 11, an exemplary flowchart showing a process 1100 for performing secure and flexible searches of encrypted data is shown. In accordance with above embodiments, process 1100 may be implemented in system 100 depicted in FIG. 1. For example, process 1100 may be performed by a computing device utilized by a client, e.g., client 104. Alternatively, process 1100 may be performed separate from a client, such as at a proxy server intermediate between the client 104 and the network storage resource 102.

At step 1102, process 1100 may send encrypted data from a client, e.g., client 104, to a database, e.g., database 118, for storage at the database. At step 1104, process 1100 may formulate a transformed search query for the database. In some embodiments, process 1100 may identify a plaintext string in a search query. Continuing with the example above, the plaintext string in the search query may include, e.g., SELECT*FROM customer WHERE name="Jon*". The client 104 may apply the plaintext string to a language dictionary accessible to the client 104 (e.g., dictionary 904 as shown in FIG. 9) and receive, based on the language dictionary, one or more plaintext search strings. In some embodiments, the plaintext search strings may be based on the plaintext string in the search query. Such plaintext search strings may include, e.g., SELECT*FROM customer WHERE name="Jon", SELECT*FROM customer WHERE name="Jonna", SELECT*FROM customer WHERE name="Jones", SELECT*FROM customer WHERE name="Jonathan", etc. The client 104 may encrypt each of these plaintext search strings and send the encrypted search strings as the transformed search query to the database 118 for processing. Alternatively, the plaintext search strings may be presented to the client 104 as selectable recommendations. In such embodiments, the client 104 may select and encrypt one or more plaintext search strings and send the one or more encrypted search strings as the transformed search query to the database 118 for processing. Furthermore, in some embodiments, the client 104 may concatenate certain database schema information together with one or more plaintext search strings and encrypt the concatenated database schema information and the plaintext search strings to formulate the transformed search query.

At step 1106, process 1100 may send the transformed search query to the database 118 for querying. The database 118 may process the querying in manners described above. At step 1108, process 1100 may receive a result based on the transformed search query. In some embodiments, process 1100 may receive one or more results from the database 118 based on one or more encrypted plaintext search strings. Upon receiving one or more results, the client 104 may decrypt the one or more results on client-side to obtain the queried data in plaintext.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present disclosure. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of the these terms is intended to include all such new technologies a priori.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for performing secure and flexible searches of encrypted data, the operations comprising:
   maintaining a database of a plurality of sets of encrypted data;
   training at least one of a definitional dictionary or a synonym dictionary through receipt of client-provided feedback;
   receiving a transformed search query for the database, the transformed search query having undergone a transformation process at a client including:
      identifying a plaintext string in a search query at the client, applying the plaintext string to a language dictionary accessible to the client, the language dictionary being at least one of the definitional dictionary or the synonym dictionary,
      receiving, based on the language dictionary, one or more plaintext search strings,
      concatenating schema information of the database with the one or more plaintext search strings, and
      encrypting, at the client, the concatenated schema information of the database and the one or more plaintext search strings to generate the transformed search query; and
   returning a result based on the transformed search query, the result being based on the encrypted concatenated schema information of the database and the one or more plaintext search strings.

2. The non-transitory computer readable medium of claim 1, wherein the plaintext string applied to the language dictionary is a search prefix.

3. The non-transitory computer readable medium of claim 1, wherein the applying of the plaintext string to the language dictionary is a similarity-based search.

4. The non-transitory computer readable medium of claim 1, wherein the receiving includes receiving a plurality of plaintext search strings and the encrypting includes encrypting each of the plurality of plaintext search strings.

5. The non-transitory computer readable medium of claim 1, wherein the receiving includes receiving a plurality of plaintext search strings based on the plaintext string in the search query.

6. The non-transitory computer readable medium of claim 5, wherein the plurality of plaintext search strings are presented to a user as selectable recommendations.

7. A computer-implemented method for performing secure and flexible searches of encrypted data, the method comprising:
   maintaining a database of a plurality of sets of encrypted data;
   training at least one of a definitional dictionary or a synonym dictionary through receipt of client-provided feedback;
   receiving a transformed search query for the database, the transformed search query having undergone a transformation process at a client including:
      identifying a plaintext string in a search query at the client,
      applying the plaintext string to a language dictionary accessible to the client, the language dictionary being at least one of the definitional dictionary or the synonym dictionary,
      receiving, based on the language dictionary, one or more plaintext search strings,
      concatenating schema information of the database with the one or more plaintext search strings, and
      encrypting, at the client, the concatenated schema information of the database and the one or more plaintext search strings to generate the transformed search query; and
   returning a result based on the transformed search query, the result being based on the encrypted concatenated schema information of the database and the one or more plaintext search strings.

8. The computer-implemented method of claim 7, wherein the encrypting includes individually encrypting each of the one or more plaintext search strings.

9. The computer-implemented method of claim 7, further comprising returning a plurality of results based on the transformed search query.

10. A non-transitory computer readable medium including instructions that, when executed by at least one processor, cause the at least one processor to perform operations for performing secure and flexible searches of encrypted data, the operations comprising:

training at least one of a definitional dictionary or a synonym dictionary through receipt of client-provided feedback;

sending encrypted data from a client to a database for storage at the database;

formulating a transformed search query for the database, the formulating including:

identifying a plaintext string in a search query, applying the plaintext string to a language dictionary accessible to the client, the language dictionary being at least one of the definitional dictionary or the synonym dictionary, receiving, based on the language dictionary, one or more plaintext search strings, concatenating schema information of the database with the one or more plaintext search strings, and encrypting, at the client, the concatenated schema information of the database and the one or more plaintext search strings to generate the transformed search query;

sending the transformed search query to the database for querying; and receiving a result based on the transformed search query.

11. The non-transitory computer readable medium of claim 10, wherein the operations further comprise receiving a plurality of plaintext search strings based on the language dictionary.

12. The non-transitory computer readable medium of claim 11, wherein the operations further comprise encrypting each of the plurality of plaintext search strings.

13. The non-transitory computer readable medium of claim 12, wherein the transformed search query includes each of the encrypted plurality of plaintext search strings.

14. The non-transitory computer readable medium of claim 13, wherein the operations further comprise receiving a plurality of results from the database based on the encrypted plurality of plaintext search strings.

15. The non-transitory computer readable medium of claim 10, wherein the plaintext string applied to the language dictionary is a search prefix.

16. The non-transitory computer readable medium of claim 10, wherein the applying of the plaintext string to the language dictionary is a similarity-based search.

17. The non-transitory computer readable medium of claim 10, wherein the operations further comprise encrypting the concatenated database schema information and at least one of the one or more plaintext search strings.

* * * * *